Figure 1:
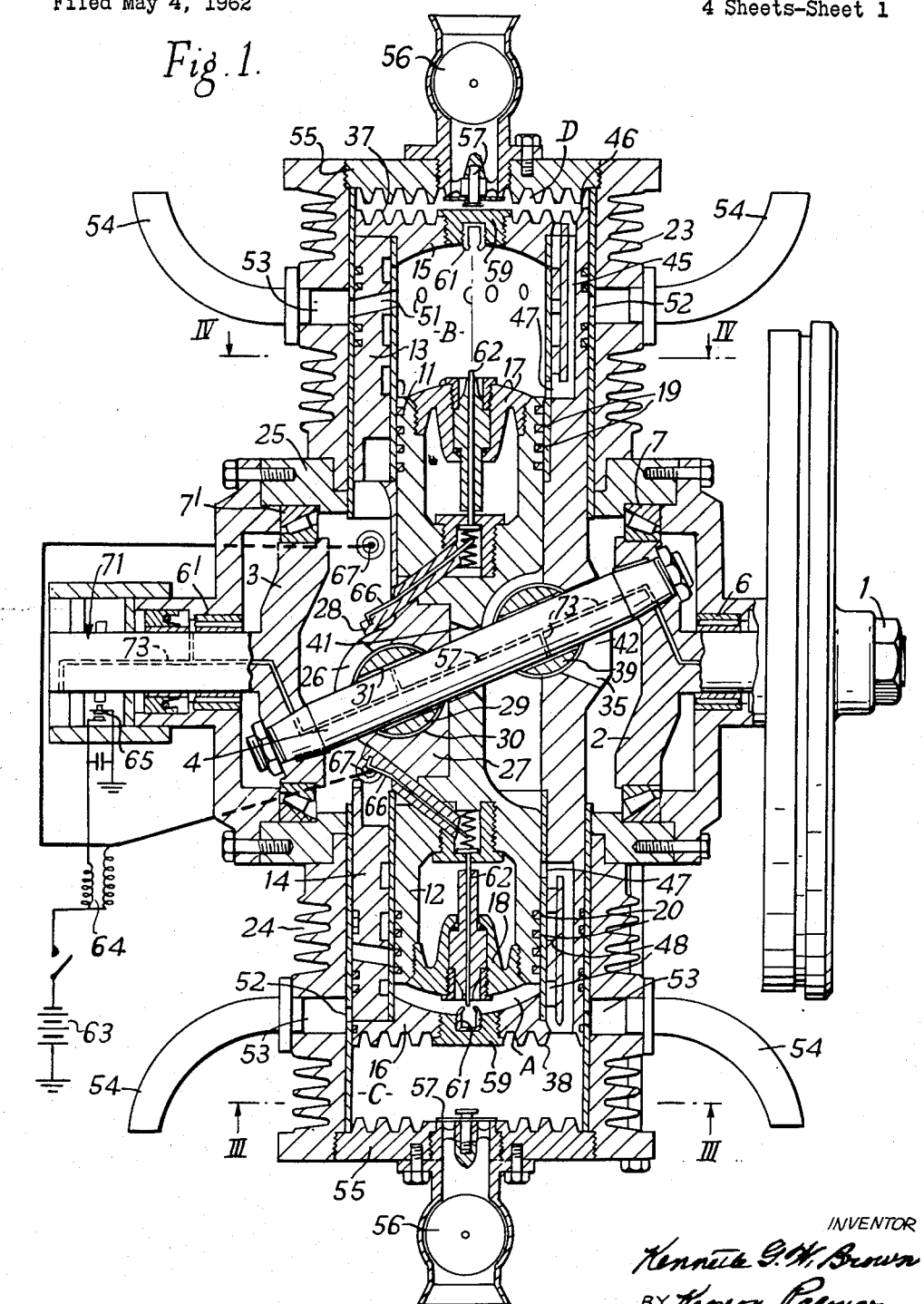

Sept. 21, 1965  K. G. W. BROWN  3,207,138
RECIPROCATORY ENGINES AND PUMPS
Filed May 4, 1962  4 Sheets-Sheet 1

INVENTOR
Kenneth G. W. Brown
BY Kenyon Palmer,
Stewart & Estabrook
ATTORNEYS

Sept. 21, 1965   K. G. W. BROWN   3,207,138
RECIPROCATORY ENGINES AND PUMPS
Filed May 4, 1962   4 Sheets-Sheet 3

INVENTOR
Kenneth G. W. Brown
BY Kenyon, Palmer,
Stewart & Estabrook
ATTORNEY

Sept. 21, 1965 K. G. W. BROWN 3,207,138
RECIPROCATORY ENGINES AND PUMPS
Filed May 4, 1962 4 Sheets-Sheet 4

INVENTOR
KENNETH G.W. BROWN
BY
Kenyon, Palmer, Heard
& Estabrook ATTORNEYS

United States Patent Office 3,207,138
Patented Sept. 21, 1965

3,207,138
RECIPROCATORY ENGINES AND PUMPS
Kenneth Gordon Wynne Brown, Anchor House,
Longcross Road, Chertsey, Surrey, England
Filed May 4, 1962, Ser. No. 192,488
Claims priority, application Great Britain, May 5, 1961,
16,463/61
9 Claims. (Cl. 123—50)

The present invention relates to improvements in reciprocatory engines and pumps and more particularly, but not exclusively, to two stroke internal combustion engines.

In conventional reciprocatory engines and pumps, the kinetic energy of the reciprocatory parts, normally pistons or plungers, changes repeatedly from zero to a maximum value and thereafter back to zero, this process occurring twice in each shaft revolution.

An object of the present invention is to provide reciprocatory engines and pumps of simple construction without long connecting rods in which the reciprocatory parts retain kinetic energy even at the end of a stroke.

There is provided according to the present invention a reciprocatory engine or pump comprising a rotatable shaft and a working chamber the volume of which is arranged to be cyclically varied by a reciprocatory part having a cylindrical guide surface, wherein a portion of the reciprocatory part spaced from the axis thereof is direct coupled to a crankpin carried by the shaft, and spaced from the axis thereof, by means of a universal coupling which accommodates relative movement of the said portion along the crankpin while constraining the reciprocatory part to oscillate angularly about its axis in quadrature with its linear oscillatory motion when the shaft rotates.

As a consequence, the angular velocity of the reciprocating part is a maximum at each end of the linear axial stroke and the reciprocating part retains kinetic energy even when its linear axial velocity is zero.

The coupling must be capable of accommodating limited relative axial movement since the substantially circular path of the part of the coupling carried by the reciprocatory part does not lie wholly in a plane perpendicular to the shaft axis.

In order to reduce the maximum velocities, accelerations and decelerations of the reciprocating parts, both the working piston and the working cylinder, which together define a working chamber of the engine or pump, may be arranged to reciprocate, conveniently with the same angular motion but with opposite linear motions.

Dynamic balance of the engine or pump may be achieved by making the masses of the piston assemblies and cylinder assemblies equal. If this is not possible or not desirable for other reasons, the output or input drive connection should be made on the part of the shaft to which the heavier of the two assemblies is connected.

A similar arrangement may be used for pumps, in which case the working substance is discharged from the working chambers into the exhaust or outlet ports in the last part of the working cylinder compression stroke.

Figure 2:
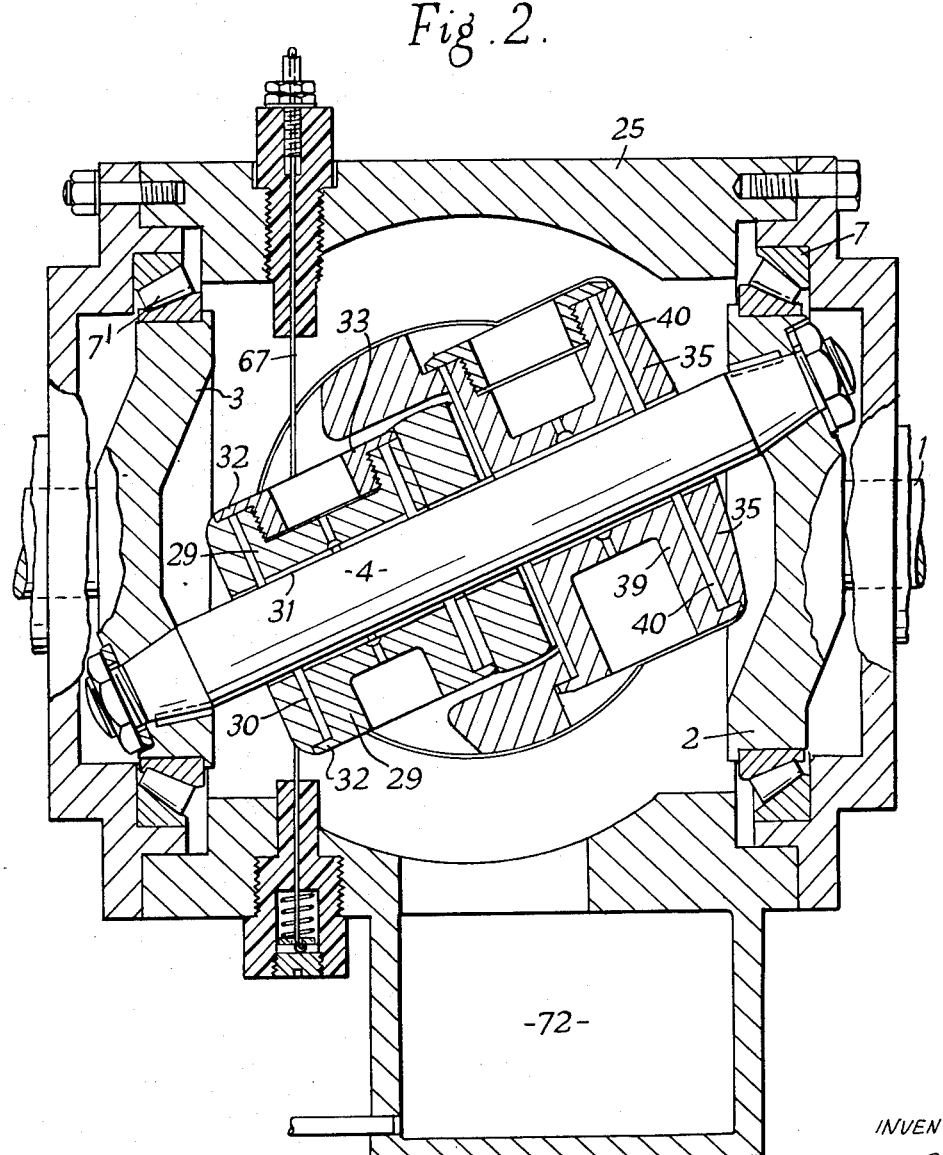
Figure 4:
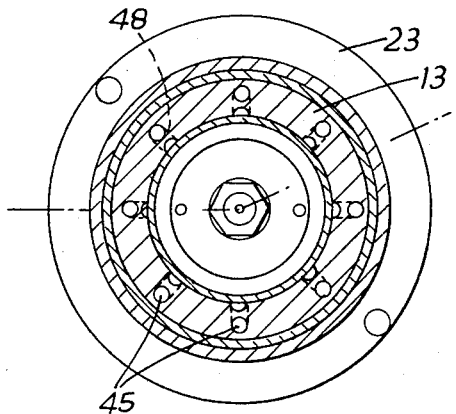
Figure 5:
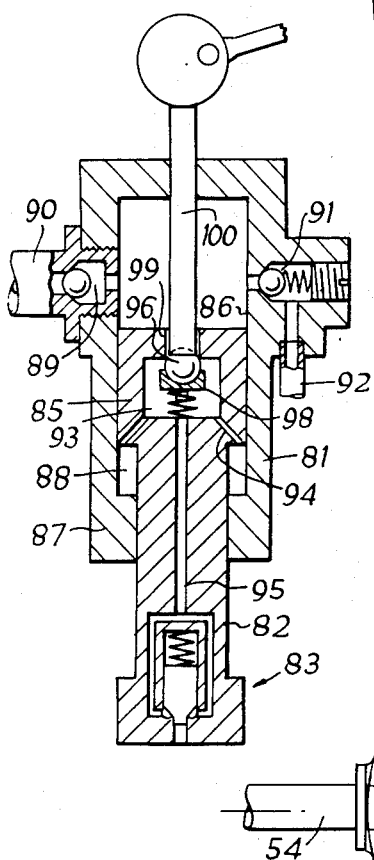
Figure 3:
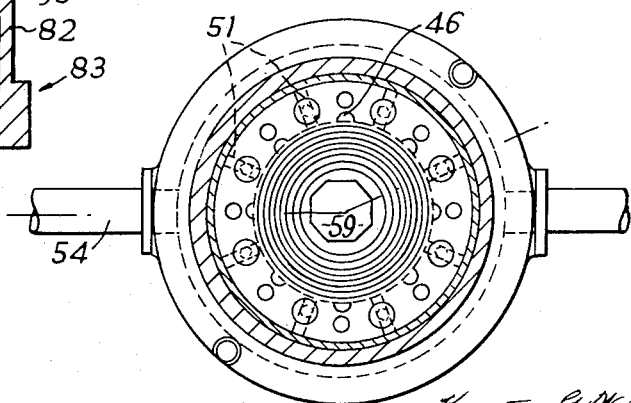
Figure 6:
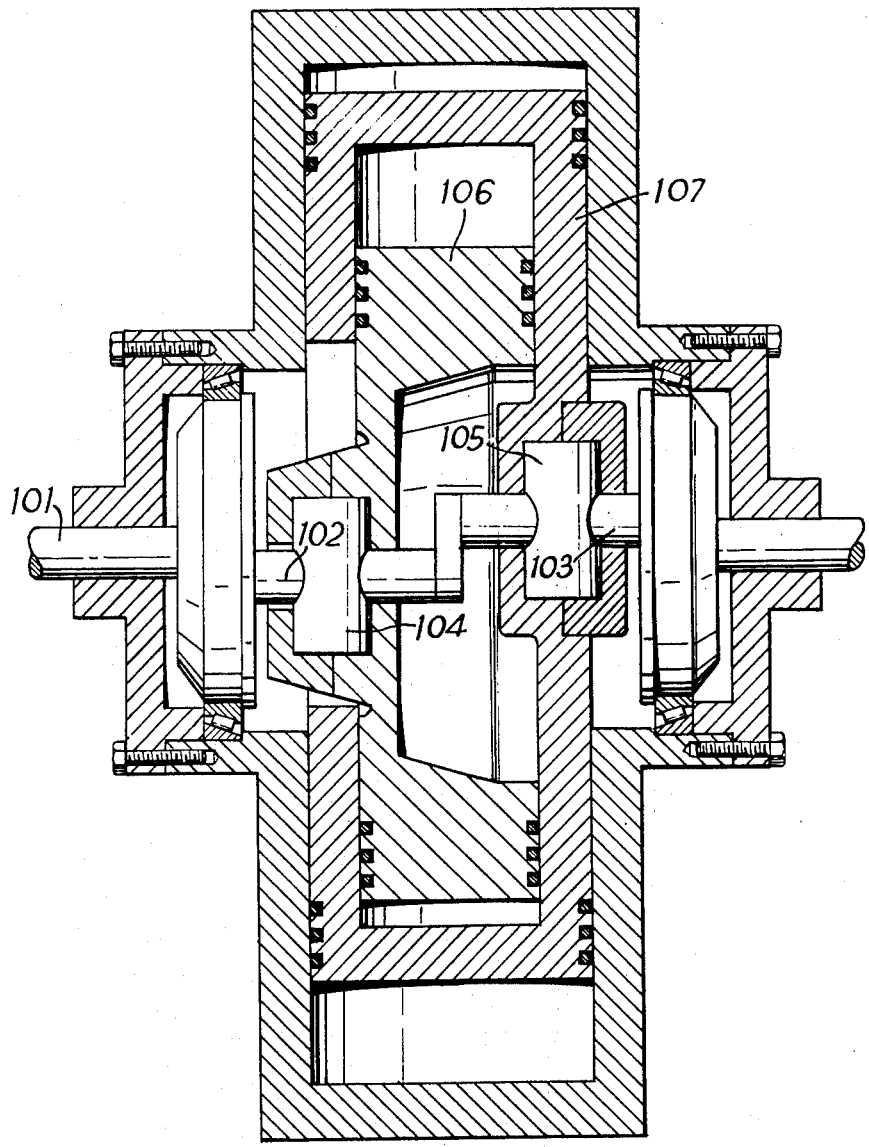

Two-stroke internal combustion engines according to the invention will now be described by way of example with reference to the accompanying drawings, in which:

FIG. 1 is a horizontal section of a spark ignition engine, the section of the left-hand portions of reciprocating parts being taken on a plane at 22½° to the remainder of the section, FIG. 2 is a vertical section of the engine on the line II—II of FIG. 1 with the engine shaft rotated through 90°, FIG. 3 is a cross-section on the line III—III of FIG. 1, FIG. 4 is a cross-section on the line IV—IV of FIG. 1, FIG. 5 is a sectional view of a metering fuel pump and injector for a compression ignition engine, and FIGURE 6 is a horizontal section of a spark ignition engine illustrating a variation of a coupling arrangement in accordance with the invention.

The output shaft 1 of the engine includes an inclined crankpin assembly consisting of two axially spaced discs 2 and 3 rigidly connected by an inclined crankpin 4 which is symmetrically disposed about the output shaft axis which therefore intersects the crankpin axis at a point 5 midway between the two discs 2 and 3. The output shaft 1 is supported in needle bearing 6 and 6′ on each side of the crankpin assembly and in tapered roller bearings 7 and 7′ on the radially outer peripheries of the two flywheel discs 2 and 3.

Associated with the inclined crankpin assembly is a pair of opposed piston-and-cylinder working chambers each consisting of a cylindrical piston 11 and 12 slidably engaged in a working-cylinder 13 and 14 respectively which is closed at its end remote from the crankpin by a cap 15 and 16 respectively. The two pistons 11 and 12 are rigidly connected together, being in this embodiment machined from a single length of cylindrical light alloy bar, the two end surfaces of which are hollowed out and closed by piston face end covers 17 and 18. Conventional sets of piston rings 19 and 20 are fitted in the piston side walls. The two working-cylinders 15 and 16 are also rigidly connected together and have their outer surfaces shaped as precompressor pistons which are a freely sliding and rotational fit in stationary closed-ended precompressor cylinders 23 and 24 secured to the engine frame 25.

Two circumferentially spaced lugs 26 project slightly from a block 27 secured in a stepped cut-away part 28 of the side wall of the working-piston assembly midway between the two working piston end face caps 17 and 18. The lugs 26 lie symmetrically disposed on opposite sides of the plane of FIG. 1. A cylindrical piston crankpin runner 29 is rotatably secured in plain bearings 30 in the lugs 26 with its axis perpendicular to the plane of FIG. 1. The runner 29 has a central transverse bore 31 in which the crankpin is a close sliding fit in plain bearings. Axial location of the crankpin runner in the lugs 26 is effected by plain-side thrust bearings 32 carried by enlarged end caps 33 forming part of, and screwed into, the ends of the crankpin runner 29 (see FIG. 2).

The working cylinder assembly 13 and 14 carries two spaced radially outwardly extending lugs 35 half way between the two precompressor piston end faces 37 and 38. A working-cylinder crankpin runner 39 is secured in bearings 40 in the lugs 35, the arrangement of the working-cylinder lugs 35 and crankpin runner 39 being similar to that of the working-piston lugs 26 and crankpin runner 29 with the exception that the working-cylinder crankpin runner 39 engages the crankpin 4 at the same distance from, but on the opposite side of the midpoint 5 of the crankpin to the working-piston crankpin runner 29.

Both the working-cylinder assembly 13, 14 and the working-piston assembly 11, 12 are formed with slots 41 and 42 respectively extending parallel to their axes to accommodate movement of the crankpin relative to the axes of the working-cylinder and working-piston assemblies respectively.

Each working-cylinder 13, 14 has eight inlet passages 45, extending longitudinally in its cylindrical side wall. The inlet passages 45 are spaced at equal angular intervals about the cylinder axis and extend parallel to this axis from openings 46 near the periphery of the outer end surfaces of the working-cylinders to inwardly directed inlet ports 47 opening through the inner cylindrical walls of the working-cylinders. The inner ends of the inlet ports 47 lie in a circle in a region of the working cylinder wall which is uncovered by the working-piston only near the end of an expansion stroke of a working chamber. The inlet ports 47 may be angled so as to impart swirl to the ingoing charge. Additional labyrinth passages 48 interconnect the openings 46 and 47 serving to assist the cooling of the working chamber walls.

Eight exhaust ports 51 are drilled through the cylindrical wall of each working cylinder and pass through the cylinder wall midway between, and at right angles to, adjacent inlet passages 45, being positioned in a region of the cylinder wall which is uncovered by the piston before the inlet ports 47 during an expansion stroke of the working chamber.

Exhaust passages 52 are formed in the stationary precompressor cylinders in positions in which they register with the exhaust ports in the working cylinders during the last part of an expansion stroke of the respective working chamber. The exhaust passages in the precompressor are so arranged in relation to the working-cylinder exhaust ports 51 as to allow for alteration of the part of a cycle during which exhaust ports are open by angular adjustment of the precompressor cylinders to suit running conditions.

The exhaust passages 52 in the precompressor cylinders 23, 24 open outwardly into annular passages 53 which in turn communicates with an exhaust manifold 54 and silencer (not shown).

Each precompressor end cover 55 is removable and carries a carburetor 56 from which a mixture of fuel and air is drawn into the precompressor chamber through a non-return diaphragm valve 57.

The end cover 15 of each working cylinder is detachably bolted on and has a central plug 59 screwed into it. The plugs 59 carry the earth electrodes 61 of split sparking plugs, the insulated live electrodes 62 of which are secured in the piston end faces 17, 18. The high tension supply for the sparking plugs is derived from a conventional ignition circuit comprising a D.C. battery 63, a coil 64 and a contact breaker 65 operated by the shaft 1 and is picked by wipers 66 either from fixed wires 67 in the crankcase as shown in the drawings or from insulated sectors carried by one or both of the crankshaft discs 2 and 3.

The divided sparking plug arrangement avoids or reduces "whiskering" and oiling-up of the sparking plug electrodes.

An operating cycle of the engine is as follows.

In the position shown in FIG. 1, the working chamber A in the lower part of the figure (hereinafter referred to as the first) has just completed a compression stroke while the second working chamber B has just completed an expansion stroke that is to say the first working chamber is at top dead centre and the second at bottom dead centre. In this position, the working-pistons 11, 12 and cylinders 13, 14 are moving in the same sense about their axis with the maximum angular velocity which they attain during the cycle while their linear velocities are zero. Thus the kinetic energy associated with the angular motion of the reciprocating parts is a maximum while that associated with their linear motion is zero.

At this juncture a compressed charge of fuel and air mixture is burning in the first working chamber A; the first precompressor chamber C is at its maximum volume and has just drawn in a charge of mixture through the inlet ports and passages; the inlet and exhaust ports of the first working chamber A are closed; the inlet 47 and exhaust 51 ports of the second working chamber B are uncovered, the exhaust ports 51 being in register with the precompressor exhaust passages 52 and the second precompressor chamber D is isolated from the carburetor by the valve 57 and its compressed charge of mixture is being transferred into the second working chamber B through the inlet passages and ports 45 and 47.

As the output shaft continues to rotate, the first working-piston and the first working-cylinder 16 begin to move apart with equal accelerations but in opposite directions. The burning mixture in the first working chamber A thus begins to expand and the forces exerted by it on the working-piston and cylinder end walls are transmitted through the crankpin runners to exert driving torques on the crankpin 4 which increase with continuing crankpin rotation. Due to the opposite motions of the working pistons and working cylinders, primary balancing of the engine is greatly simplified.

At the same time, the charge of mixture in the second working chamber B begins to be compressed as the second working cylinder 13 begins to move towards the output shaft axis in opposition to the second piston 11, while a vacuum begins to be formed in the second precompressor chamber D so that its valve 57 opens to admit a fresh charge of mixture. The charge of mixture in the first precompressor chamber C begins to be compressed as the outer piston surface of the first working cylinder 14 begins to move away from the output shaft axis.

The initial movements described above of the various engine components continue past the position in which the crankpin has rotated through a right angle (FIG. 2). In this position, the working pistons 11 and 12 and cylinders 13 and 14 have rotated about their common axis through an angle equal to the angle of inclination of the crankpin axis to the output shaft axis. Their instantaneous angular velocity is then zero while their linear velocities in the direction of the working chamber axis and the kinetic energy associated therewith have attained their maximum values. The crankpin runners have moved a short distance inwards towards the central point 5 of the crankpin axis.

Shortly after the crankpin has rotated through this position, the first working-piston 12 uncovers the exhaust ports 51 in the wall of the first working cylinder 14. Towards the end of the working stroke, these exhaust ports 51 register with the exhaust passages 52 allowing the burnt gases to surge out of the first working chamber A into the exhaust system.

On further expansion of the first working chamber A, the working piston 12 has uncovered the inlet ports 47 thereby allowing the precompressed fresh charge of mixture from the precompressor chamber C to surge under pressure into the working chamber A through the inlet passages and ports 45 and 47.

Meanwhile the second working piston 11 has already covered and closed the inlet ports 47 in its working cylinder, substantially all of any remaining burnt gas from the previous expansion stroke has been expelled through the exhaust ports 51 which have thereafter been covered and closed by relative movement between the working and precompressor cylinders 13, 23. The charge in the second working chamber B is thereafter compressed increasingly towards the end of the stroke and thereby relieves the crankpin of a considerable part of the forces required to decelerate the working-pistons and cylinders at this stage of the stroke. These decelerations are further assisted by the increasing conversion by the crankpin and runner mechanism of the linear motion of the working chamber parts into angular motion as these parts return to their central angular position.

Just before the working chamber B achieves maximum pressure, its charge of mixture is ignited by a spark passing between the two electrodes of its sparking plug.

Lubrication of the engine is effected by a gear type oil pump 71 feeding oil under pressure from a sump 72 through oil distribution passages 73 drilled in the crankshaft. The end walls of the precompressor chambers are formed with complementary sets of annular ribs to increase heat transfer from the working chambers.

A compression ignition engine may be constructed in a similar manner to the spark ignition engines described above, with the exception that the compression ratio is increased and the carburettors and sparking plugs are replaced by metering fuel pumps and injectors. These may be of conventional type with the injectors mounted to discharge through some of the exhaust ports 51, or similar separate ports, into the working chambers.

Alternatively the assembly shown in FIGURE 5 may be mounted in the centre of the precompressor and working cylinder end faces, the diaphragm valves 57 being then displaced to one side.

The pump comprises a body 81 secured to the closed end of the precompressor cylinder coaxially with the working chamber axis and a plunger assembly 82 which is secured to and extends through the end wall of the working cylinder to terminate in an injector nozzle mechanism 83.

The stem of the plunger 82 is cylindrical for the greater part 84 of its length but, at its end remote from the injector mechanism, is formed with a piston 85 which has a diameter slightly greater than that of its cylindrical part 84. The plunger piston 85 is a sealed sliding fit in the wider part 86 of the bore in the body 81. The diameter of the bore is reduced by a step 87 near its working chamber end so as to be a sealed sliding fit on the cylindrical plunger stem. Thus a variable volume annular pumping space 88 is formed between the plunger stem 84, 85 and the bore in the body 81.

The end of the bore 86 remote from the working chamber is connected through a non-return valve 89 to a fuel inlet pipe line 90 and to a relief valve 91 controlling a fuel spill return pipe 92 connected to the fuel inlet pipe 90.

Inside the injector pump plunger 82 is a longitudinal cavity 93 which communicates with the annular pumping space 88 by means of a number of passages 94, and through a passage 95 with the injector nozzle mechanism 83 which is of the conventional spring loaded valve type, which discharges only when the fuel pressure reaches a predetermined value.

The plunger cavity 93 also communicates with the barrel bore through a ball valve 96 which controls a short axial return passage which opens in the end face of the plunger piston.

The valve ball 96 is urged by a light spring 97 acting through a ball cup 98 so as to seat against and close off the entry to the return passage 99. A push rod 100 located centrally of the bore and plunger extends through the plunger into the cavity 93. The push rod is adjustable axially of the precompressor cylinder by means of a cam follower on its outer end which cooperates with a cam operatively connected with the engine control system. Apart from any such adjustment, the push rod remains stationary relative to the precompressor cylinder and thereby serves to hold the valve ball 96 and its cup stationary and away from the valve seat for all but the last part of a compression stroke of the associated working chamber, whereupon fuel can no longer escape from the pumping space 88 through the valve seat 99 and must therefore escape under high pressure through the injector 83.

In another coupling arrangement, shown in FIGURE 6, instead of the inclined crank-pin described above, the drive shaft 101 has two crank-pins 102, 103 with their axis parallel to and equally displaced either side of the shaft axis. In this arrangement one crank-pin runner 104, 105 is engaged on each crack-pin 102, 103 respectively so as to be freely movable both axially of and rotationally about it. The runner 104 is pivotally connected to the working piston assembly 106 and the runner 105 on the other crank-pin is pivotally connected to the working cylinder assembly 107. The axis of pivotal connection between the runners 104, 105 and working piston-cylinder assemblies 106, 107 respectively extend at right angles to the drive shaft axis but parallel with and on on either side of the working chamber axis. The end faces of the runners 104, 105 are arranged with, or as, thrust bearings cooperating with the working piston and cylinder assemblies through which the working chamber forces are transmitted to or from the drive shaft through the crank-pins.

What is claimed is:
1. A reciprocatory engine or pump comprising:
a rotatable shaft;
a working cylinder;
means for cyclically varying the volume of said cylinder including a part reciprocating on the axis of said cylinder said part having a cylindrical guide surface, the axis of said surface intersecting the axis of said shaft;
a substantially cylindrical crankpin runner pivotally mounted in said reciprocating part and spaced from the axis of the cylinder, said runner having a bore therein;
and a crankpin rigid with said shaft and having a portion spaced from the axis of said shaft and axially slidable and rotatably engaged in said bore said crank pin being of a diameter smaller than the diameter of said runner.

2. A reciprocatory engine or pump comprising:
a housing;
a shaft rotatably mounted in said housing;
a crankpin rigid with said shaft, said crankpin having a cylindrical portion the axis of which is inclined with respect to and intersects the axis of said shaft;
a working chamber;
a member for varying the volume of said chamber, said member being movable along and about an axis perpendicular to the axis of said shaft and passing through the intersection of the axes of said shaft and crankpin;
and a substantially cylindrical crankpin runner journalled in said member for angular movement about an axis perpendicular to but spaced from the axis of said member through an angle at least twice the angle between said crankpin and said shaft, said crankpin runner being of a diameter greater than said crankpin and having a transverse bore therethrough housing the cylindrical portion of said crankpin for axial sliding and rotating movement.

3. A reciprocatory engine or pump according to claim 2, wherein said crankpin runner includes an integral flange at one end and a detachable flanged cap at the other end, said flanges forming thrust bearings substantially to avoid axial movement of said crankpin runner relative to said member.

4. A reciprocatory engine or pump comprising:
a housing;
a crankshaft rotatably mounted in said housing;
said crank-shaft including a crankpin inclined at an angle to and intersecting the axis of said shaft, said crankpin including first and second cylindrical portions;
a cylinder assembly including a cylinder guidely mounted in said housing for linear and angular movement about its axis, said cylinder axis intersecting said shaft axis at right angles;
a piston assembly including a piston slidably mounted in said cylinder and defining a working chamber in said cylinder of variable volume;
a first crankpin runner journalled in said cylinder about an axis perpendicular to and spaced from said cylinder axis, said first crankpin runner having a transverse bore slidably receiving said first cylindrical portion of said crankpin;
and a second crankpin runner journalled in said piston assembly about an axis parallel to the axis of said first crankpin runner, said second crankpin runner having a transverse bore slidably receiving said second cylindrical portion of said crankpin, said first and second portions of said crankpin being on opposite sides of said shaft axis.

5. A reciprocatory engine or pump according to claim 4, wherein said cylinder and piston assemblies include a second cylinder and piston respectively defining a second working chamber on the opposite side of said shaft to said first working chamber.

6. A reciprocatory engine or pump according to claim 4, and further including a stationary precompressor cylinder, slidably and angularly housing said cylinder.

7. A reciprocatory engine or pump according to claim 4, wherein the cylinder includes ports which act as a sleeve valve.

8. A reciprocatory engine or pump according to claim 6, wherein the wall of said cylinder is formed with longitudinal transfer passages extending from the end surface of said piston exposed in said precompressor cylinder to the working chamber.

9. A reciprocatory engine or pump according to claim 8, wherein said precompressor cylinder includes an inlet and a non-return valve controlling said inlet.

References Cited by the Examiner

UNITED STATES PATENTS

| | | | |
|---|---|---|---|
| 651,741 | 6/10 | Anderson | 123—45 |
| 1,278,571 | 9/18 | Bell | 123—50 |
| 1,393,702 | 10/21 | Sanchez | 123—162 |
| 1,578,228 | 3/26 | Yearsley | 123—56 |
| 1,619,696 | 3/27 | Bowen | 123—71 |
| 1,940,003 | 12/33 | Mattacchione | 123—50 |
| 2,042,083 | 5/36 | Watts | 74—50 |
| 2,132,802 | 10/38 | Pierce | 123—56 |
| 2,387,540 | 10/45 | Swain | 123—71 |
| 2,512,185 | 6/50 | Thompson | 74—50 |
| 2,666,420 | 1/54 | Teisen | 123—45 |

FOREIGN PATENTS

| | | |
|---|---|---|
| 131,632 | 8/19 | Great Britain. |
| 507,699 | 7/20 | France. |

OTHER REFERENCES

German printed application 1,005,801, Hochdruck, Apr. 4, 1957.

FRED E. ENGELTHALER, *Primary Examiner*.